Figure 1:
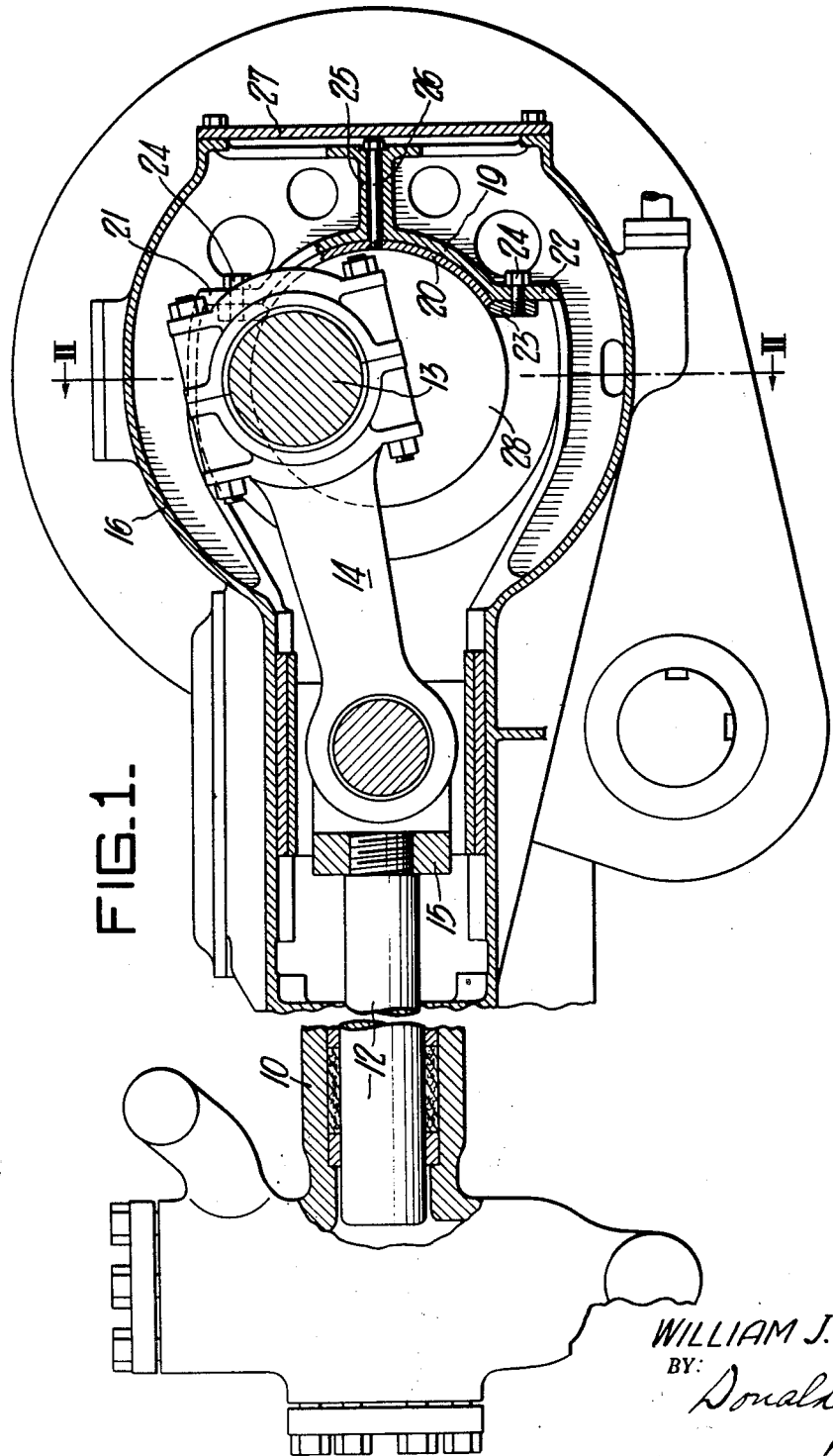

Aug. 22, 1950 W. J. REDMAN 2,519,501
CRANKSHAFT BEARING

Filed March 15, 1949 2 Sheets-Sheet 1

INVENTOR:
WILLIAM J. REDMAN,
BY Donald G. Dalton
his Attorney.

Aug. 22, 1950     W. J. REDMAN     2,519,501
CRANKSHAFT BEARING
Filed March 15, 1949     2 Sheets-Sheet 2
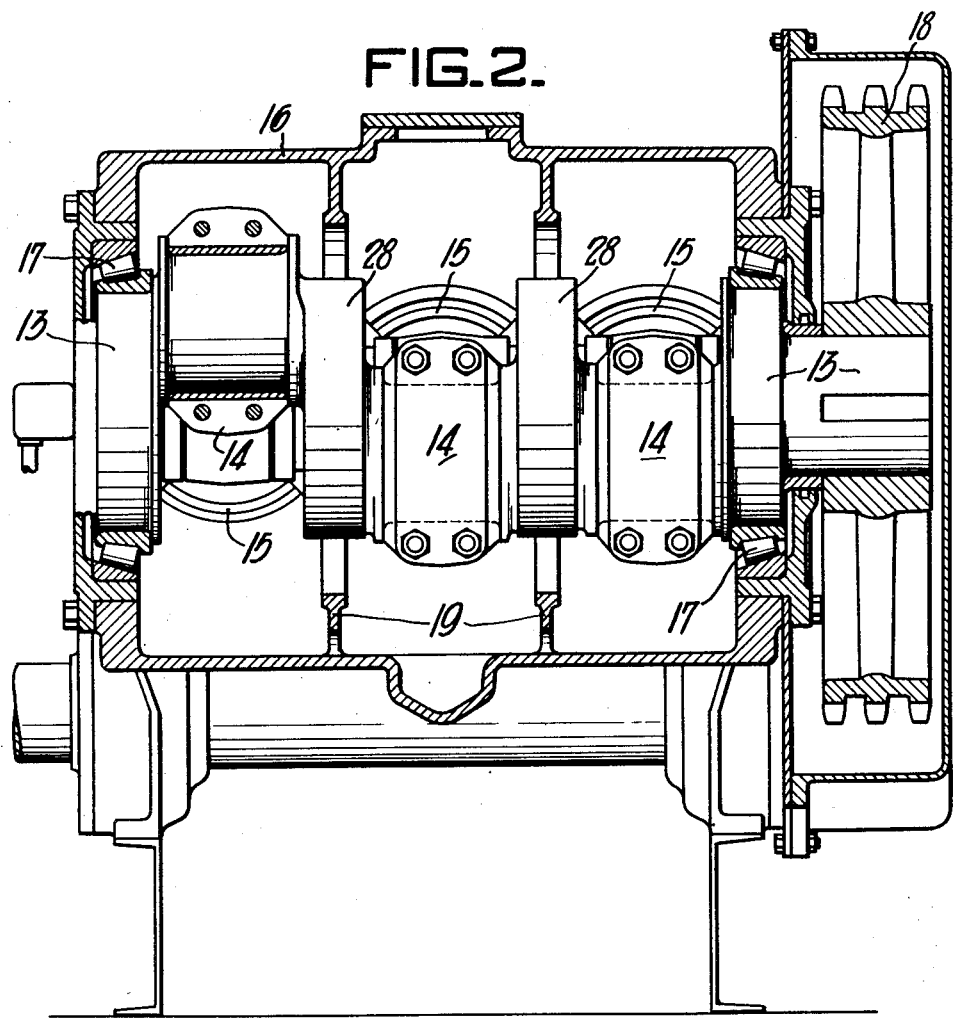
INVENTOR:
WILLIAM J. REDMAN,
BY Donald G. Dalton
his Attorney.

Patented Aug. 22, 1950

2,519,501

UNITED STATES PATENT OFFICE 2,519,501

CRANKSHAFT BEARING

William J. Redman, Pittsburgh, Pa., assignor to Oil Well Supply Company, a corporation of New Jersey Application March 15, 1949, Serial No. 81,601

4 Claims. (Cl. 103—202)

This invention relates to crankshaft bearings, particularly those suitable for single action, multiple cylinder reciprocating pumps.

An object of the invention is to provide improved bearings which furnish additional support for pump crankshafts during power strokes of the pump.

A further object of the invention is to provide improved reciprocating pumps which have intermediate bearings for the crankshaft on the side opposite the reciprocable elements for absorbing part of the thrust during power strokes, thereby permitting use of lighter crankshafts and main bearings.

In accomplishing these and other objects of the invention, I have provided improved details of structure, a preferred form of which is shown in the accompanying drawing, in which:

Figure 1 is a vertical longitudinal sectional view of a reciprocating pump which has improved crankshaft bearings embodying features of the present invention; and Figure 2 is a vertical cross-sectional view taken substantially on line II—II of Figure 1.

In the drawing there is shown a reciprocating pump which has a plurality of cylinders 10, herein illustrated as three in number. Each cylinder contains a reciprocable element 12, herein illustrated as a plunger, which is driven in the usual fashion from a crankshaft 13, a connecting rod 14 and a crosshead 15. The power strokes of the three plungers take place sequentially one at a time, the three cranks on the crankshaft being spaced 120° apart for this purpose. The crankshaft is mounted in a housing 16 on main antifriction bearings 17 at each end and carries a drive pulley 18, which is connected to any suitable drive mechanism. The details of the connecting rods, crossheads, plungers and cylinders per se are not part of the present invention and may be varied as desired. Hence the showing of these parts is to be taken only as one example of an arrangement in which the bearing means of the present invention can be incorporated.

In accordance with the present invention, housing 16 has an integral crescent shaped web 19 opposite each space between cranks on crankshaft 13. A bearing shoe 20 is removably fastened to the inner face of each web 19 and extends through an arc of approximately 120° opposite the crossheads. The web has upper and lower offsets 21 and 22 approximately 120° apart to which the ends of the shoe are attached. The preferred attaching means includes clamp plates 23, which abut the ends of the shoe, and bolts 24 which pass through said offsets and clamp plates. The central portion of the web has an integral hollow sleeve 25 that extends to the back of the housing. The shoe is additionally fastened to the web by a screw 26 that passes through this sleeve. The back end of the housing has a removable cover plate 27 through which screws 24 and 26, the clamping plates and the shoes are accessible for replacing the shoes when they become worn. It is seen that both the inside and the outside faces of the shoes are free of protuberances so that these faces can be machined readily.

Crankshaft 13 carries collars or journals 28 which are positioned so that they can engage the inner faces of shoes 20 through the approximately 120° arc that these shoes extend. In the preferred construction the journals clear the bearing shoes under normal pump loads. During excessive or peak loads the crankshaft receives an excessive bending moment on each power stroke of the reciprocable elements. The crankshaft is deflected slightly and the bearing shoes engage and support the crankshaft opposite the reciprocable elements and thus absorb a substantial part of the thrust from this additional bending moment.

It is seen that alternatively crankshaft bearings constructed according to the present invention could engage the crankshaft at all times. In either case the bearings furnish additional support for the crankshafts where such support is most needed. Therefore such bearings permit the use of lighter crankshafts and main bearings and reduce the overall weight of the assembly. At the same time the structure is simple and rugged and easy to maintain.

While I have shown and described only certain preferred embodiments of the invention, it is apparent that further modifications may arise. Therefore, I do not wish to be limited to the disclosure set forth but only by the scope of the appended claims.

I claim:

1. In a single action, multiple cylinder reciprocating pump having a crankshaft, connecting rods and crossheads for driving the reciprocable elements, and a housing and bearings rotatably mounting said crankshaft, additional bearing means for supporting said crankshaft during power strokes of the reciprocable elements comprising journals on said crankshaft intermediate the cranks, and bearing shoes carried in said housing on the side opposite said crossheads and engageable with said journals for absorbing part of the thrust of bending moments in the crankshaft.

2. In a single action, multiple cylinder reciprocating pump having a crankshaft, connecting rods and crossheads for driving the reciprocable elements, and a housing and bearings rotatably mounting said crankshaft, additional bearing means for supporting said crankshaft during power strokes of the reciprocable elements comprising journals on said crankshaft intermediate the cranks, webs in said housing on the side opposite said crossheads and being aligned with said journals, and bearing shoes removably attached to the inside of said webs and engageable with said journals for absorbing part of the thrust of bending moments in said crankshaft.

3. In a single action, multiple cylinder plunger pump having a crankshaft, connecting rods and crossheads for reciprocating the plungers, and a housing and bearings rotatably mounting said crankshaft, additional bearing means for supporting said crankshaft during power strokes of the plungers under peak pump loads comprising journals on said crankshaft intermediate the cranks, crescent shaped webs in said housing on the side opposite said crossheads and having offsets approximately 120° apart and a central sleeve between said offsets, said webs being aligned with said journals, bearing shoes on the inside of said webs between said offsets, fastening means removably attaching said bearing shoes to said webs at said offsets and said sleeve, said journals normally clearing said bearing shoes but being adapted to engage said bearing shoes when said crankshaft flexes during power strokes of the plungers under peak pump loads for absorbing part of the thrust of bending moments in said crankshaft, and a removable cover plate closing said housing and furnishing access to said bearing shoes.

4. In a single action, multiple cylinder plunger pump having a crankshaft, connecting rods and crossheads for reciprocating the plungers, and a housing and bearings rotatably mounting said crankshaft, additional bearing means for supporting said crankshaft during power strokes of the plungers under peak pump loads comprising journals on said crankshaft intermediate the cranks, crescent shaped webs in said housing on the side opposite said crossheads and having offsets approximately 120° apart and a central sleeve between said offsets, said webs being aligned with said journals, bearing shoes on the inside of said webs between said offsets, clamping plates and screws removably attaching said bearing shoes to said webs at said offsets, screws removably attaching said bearing shoes to said webs at said sleeves, the arcuate faces of said bearing shoes being free of protuberances to facilitate their machining, said journals being adapted to engage said bearing shoes during power strokes of the plungers under peak pump loads for absorbing part of the thrust of bending moments in said crankshaft, and a removable cover plate closing said housing and furnishing access to said bearing shoes.

WILLIAM J. REDMAN.

No references cited.